United States Patent
Hsu et al.

(10) Patent No.: US 7,166,264 B2
(45) Date of Patent: *Jan. 23, 2007

(54) PROCESSES FOR PURIFYING PHOSPHORIC ACID AND FOR PREPARING PHOSPHORIC ACID

(76) Inventors: Yung Hsiung Hsu, 16F, 85, Sec. 1, Chunghsiao E. Rd., Taipei (TW); Sage Hsu, 16F, 85, Sec. 1, Chunghsiao E. Rd., Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 11/393,734

(22) Filed: Mar. 31, 2006

(65) Prior Publication Data

US 2006/0171871 A1    Aug. 3, 2006

Related U.S. Application Data

(63) Continuation of application No. 10/916,395, filed on Aug. 12, 2004, now Pat. No. 7,083,768.

(30) Foreign Application Priority Data

Jun. 29, 2004   (CN)   ............................ 93 1 19094

(51) Int. Cl.
   *C01B 3/38*    (2006.01)
(52) U.S. Cl. .................................. 423/321.1

(58) Field of Classification Search ............. 423/321.1, 423/317
See application file for complete search history.

(56) References Cited

U.S. PATENT DOCUMENTS

| | | | |
|---|---|---|---|
| 3,714,330 A | 1/1973 | Barker | 423/321.1 |
| 4,215,098 A | 7/1980 | Lowe et al. | 423/305 |
| 4,233,278 A | 11/1980 | Korchnak | 423/321.2 |
| 4,296,082 A | 10/1981 | Lowe et al. | 423/305 |
| 4,495,165 A | 1/1985 | Gurza | 423/321.1 |
| 4,539,192 A | 9/1985 | Schimmel et al. | 423/321.1 |
| 4,603,039 A | 7/1986 | Kuxdorf et al. | 423/304 |
| 4,640,828 A | 2/1987 | Baumann | 423/321.1 |
| 4,649,035 A | 3/1987 | Barber | 423/317 |
| 4,657,559 A | 4/1987 | Mollere et al. | 23/297 |
| 4,986,970 A | 1/1991 | Haraldsen | 423/321.1 |
| 5,006,319 A | 4/1991 | Hall et al. | 423/54 |
| 6,251,351 B1 | 6/2001 | Potenscik et al. | 423/320 |

*Primary Examiner*—Wayne A. Langel
(74) *Attorney, Agent, or Firm*—Bacon & Thomas, PLLC

(57) ABSTRACT

A process for purifying phosphoric acid includes removing volatile components from phosphoric acid rich in impurities to form a crude phosphoric acid liquid substantially free of volatile components; heating the crude phosphoric acid liquid to a temperature above 250° C. in order to decompose phosphoric acid in the crude phosphoric acid liquid and generate gaseous phosphoric anhydride; and introducing the gaseous phosphoric anhydride into water or a dilute phosphoric acid aqueous solution in order to hydrate the gaseous phosphoric anhydride to form phosphoric acid.

12 Claims, 2 Drawing Sheets

PROCESSES FOR PURIFYING PHOSPHORIC ACID AND FOR PREPARING PHOSPHORIC ACID

This application is a continuation application of U.S. application Ser. No. 10/916,395, filed Aug. 12, 2004 now U.S. Pat. No. 7,083,768 (of which the entire disclosure of the pending, prior application is hereby incorporated by reference).

FIELD OF THE INVENTION

The present invention relates to processes for purifying phosphoric acid and for producing phosphoric acid, and particularly to processes for purifying phosphoric acid and for producing phosphoric acid by hydrating gaseous phosphoric anhydride.

BACKGROUND OF THE INVENTION

Traditionally, the methods for purifying phosphoric acid include an extraction method, e.g. the method disclosed in U.S. Pat. No. 6,251,351 extracting phosphoric acid produced by the wet process with N,N-dialkyl-α-aminoacid in order to increase the purity of phosphoric acid; a precipitation method, e.g. the method diclosed in U.S. Pat. No. 4,986,970 using dithio carbonic acid-O-ester to separate heavy metals by precipitation; and an ion-exchange method, e.g. the method disclosed in U.S. Pat. No. 5,006,319 using a strong alkaline anionic exchange resin to remove metal ions from phosphoric acid. However, the quality of phosphoric acid produced by these methods is far inferior than the quality of phosphoric acid produced by the dry process. Thus, these methods are rarely used in the industries. U.S. Pat. No. 4,495,165 discloses a purification method for phosphoric acid produced by the wet process including absorbing the phosphoric acid produced by the wet process with porous sawdust, heating the phosphoric acid absorbed in the sawdust to form polyphosphoric acid and/or phosphoric acid esters, and using water to hydrate the polyphosphoric acid and/or phosphoric esters in the porous sawdust into phosphoric acid. According to this process, about 90% to 95% of the impurities in the phosphoric acid produced by the wet process remain in the porous sawdust. Thus, a partial purification effect can be achieved. However, said purification method is a batch process and has an extremely high cost. Furthermore, the purity of phosphoric acid produced by said method is still far inferior than that of the dry process. For example, the iron content in the phosphoric acid produced by the dry process is less than 10 ppm, and the iron content in phosphoric acid purified by said method is higher than 100 ppm.

SUMMARY OF THE INVENTION

One objective of the present invention is to provide a process for purifying phosphoric acid.

Another objective of the present invention is to provide a process for purifying phosphoric acid by decomposing phosphoric acid containing impurities into gaseous phosphoric anhydride, and hydrating said phosphoric anhydride into phosphoric acid.

Another objective of the present invention is to provide a process for purifying phosphoric acid by using the combustion heat of phosphor to decompose phosphoric acid containing impurities into gaseous phosphoric anhydride, and hydrating said phosphoric anhydride into phosphoric acid.

Still another objective of the present invention is to provide a comprehensive phosphoric acid production process by combining a dry process for producing phosphoric acid and a waste phosphoric acid purification process.

A further objective of the present invention is to provide a comprehensive phosphoric acid production process by combining a dry process for producing phosphoric acid and a purification process For phosphoric acid produced by a wet process.

The inventors of the present invention heat the impurities-rich phosphoric acid after the removed of volatile components contained therein to decompose phosphoric acid and generate gaseous phosphoric anhydride; and introduce said gaseous phosphoric anhydride into water or a dilute phosphoric acid aqueous solution to hydrate said gaseous phosphoric anhydride to form phosphoric acid. The first step of the present invention removes the volatile components from the impurities-rich phosphoric acid so that a crude phosphoric acid liquid substantially free of volatile organic or inorganic impurities is obtained. The step of generating gaseous phosphoric anhydride is aimed to let non-volatile organic or inorganic impurities remain in a viscous residue solution, so that a high purity phosphoric anhydride substantially free of volatile and non-volatile organic or inorganic impurities can be hydrated to phosphoric acid.

Figure 1:
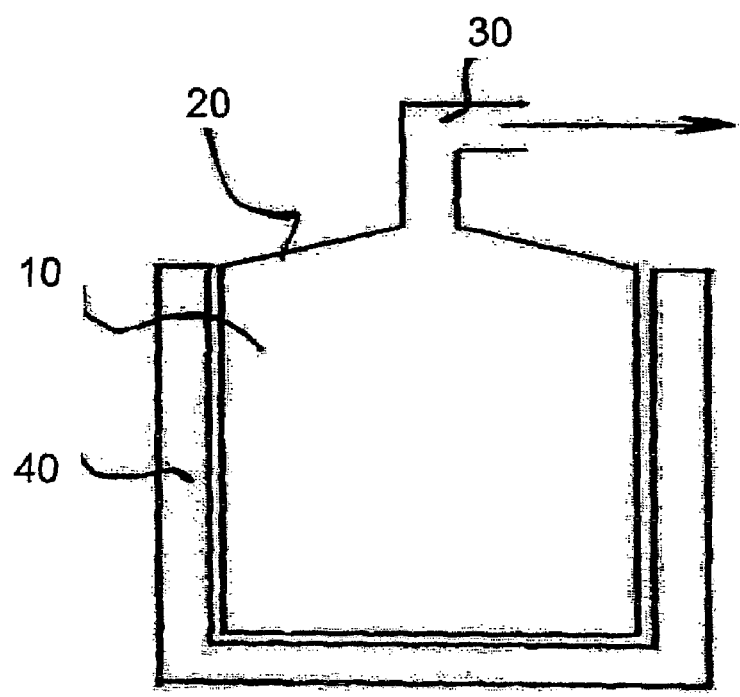
FIG. 1 is a schematic diagram of a graphite heating apparatus according to the present invention.

| Description of the numerals of the key elements | | | |
|---|---|---|---|
| 10 | Graphite heating chamber | 20 | Cover |
| 30 | Ventilation tube | 40 | Electric furnace |
| 50 | Rotary furnace body | 60, 90, 130, 140, 160 | Conduits |
| 70 | Combustion device | 80 | Ventilation tube |
| 110 | Phosphorus combustion chamber furnace body | | |
| 120 | Cover of furnace body | 150 | Nozzle |

DETAILED DESCRIPTION OF THE INVENTION

A method for purifying phosphoric acid according to the present invention comprises:

removing volatile components from phosphoric acid rich in impurities to form a crude phosphoric acid liquid substantially free of volatile components;

heating said crude phosphoric acid liquid to a temperature above 250° C. in order to decompose phosphoric acid in said crude phosphoric acid liquid and generate gaseous phosphoric anhydride; and introducing said gaseous phosphoric anhydride into water or a dilute phosphoric acid aqueous solution in order to hydrate said gaseous phosphoric anhydride to form phosphoric acid.

Said phosphoric acid rich in impurities can be a phosphoric acid product from a wet process, waste phosphoric acid, or waste miscellaneous acid containing phosphoric acid, wherein the components and amounts of the impurities vary depending on the source thereof and may include volatile components, organic impurities, and metal ions, etc.

Said volatile components can be arbitrary volatile components, e.g. nitric acid, acetic acid, etc. A certain amount of water may also be removed when removing the volatile components.

Said step of removing the volatile components can be any conventional process in removing volatile components, so that substantially all the volatile components in the phosphoric acid rich in impurities are evaporated into gas, while a certain amount of water is still retained so that an unevaporated portion is still in a liquid form (the crude phosphoric acid liquid). For example, a heating process can be used to evaporate the volatile components in the phosphoric acid rich in impurities into gas to escape therefrom, and preferably said step of removing volatile components comprises heating to a temperature above 80° C., more preferably above 100° C. For example, an aerated heating process can be used to heat the phosphoric acid rich in impurities while an insoluble gas (e.g. air) is being introduced to entrain the volatile components from the phosphoric acid rich in impurities. For example, a vacuum heating process can be used to accelerate the evacuation of volatile components from the phosphoric acid rich in impurities by heating the phosphoric acid rich in impurities in vacuo (the vacuum level being determined according to the actual requirement). Generally speaking, the vacuum heating process and the aerated heating process are preferable, and the aerated heating process is particularly preferable. When necessary, a multi-stage process can be used to remove the volatile components. For example, nitric acid and a portion of water are removed at about 80° C., and acetic acid and a portion of water are removed at about 100° C.

Said step of heating said crude phosphoric acid liquid to generate gaseous phosphoric anhydride by decomposition can be any conventional heating process, e.g. an electric heating, a combustion heating including an indirect combustion heating, and a direct combustion heating, wherein the direct combustion heating process is preferable. A phosphorus combustion direct heating process is more preferable, which includes introducing said crude phosphoric acid liquid into a phosphorus combustion chamber where phosphorus is combusted so that a combustion heat of phosphorus is used to heat and decompose said crude phosphoric acid liquid into gaseous phosphoric anhydride. Preferably, said crude phosphoric acid liquid is introduced into said combustion chamber in a manner so that a film of said crude phosphoric acid liquid is formed on a wall of the combustion chamber, and is heated and decomposed to generate gaseous phosphoric anhydride.

Said phosphorus combustion direct heating process is a dry process for producing phosphoric acid, where phosphorus is combusted in the combustion chamber to form gaseous phosphoric anhydride. Said combustion of phosphorus to form gaseous anhydride includes introducing phosphorus and an oxygen-containing gas into the combustion chamber, wherein the combustion conditions and combustion devices thereof are all similar to those of the conventional dry process for producing phosphoric acid. However, since the introduction of the crude phosphoric acid liquid according to the process of the present invention will consume a portion or even a major portion of the phosphorus combustion heat, the temperature of the combustion chamber will decrease dramatically. Generally speaking, the temperature in the combustion chamber of the conventional dry process for producing phosphoric acid is 1200° C. to 1800° C. However, the average temperature of the combustion chamber according to the present invention is 250° C. to 1000° C., preferably 300° C. to 800° C., more preferably 350° C. to 600° C. Since the temperature of the combustion chamber can be dramatically reduced, the design of a combustion chamber according to the present invention is easier. In particular, the advantages of the present invention include lower criteria on the selection of material for the combustion chamber, without the need of a heat dissipation design, and a lower equipment cost, etc. That is an average temperature of said gaseous phosphoric anhydride is kept at 300 to 800° C., preferably 350° C. to 600° C., during said step of heating said crude phosphoric acid liquid to generate gaseous phosphoric anhydride by decomposition.

Said step of introducing the gaseous anhydride into water or a dilute phosphoric acid aqueous solution to hydrate said gaseous anhydride into phosphoric acid can be carried out by the method and device adopted by the conventional dry process for producing phosphoric acid. Preferably, said step of introducing the gaseous anhydride into water or a dilute phosphoric acid aqueous solution to hydrate said gaseous anhydride into phosphoric acid comprises introducing said gaseous phosphoric anhydride generated by decomposition and the gaseous phosphoric anhydride resulting from the combustion of phosphorus into water or said dilute phosphoric acid aqueous solution to hydrate said gaseous phosphoric anhydride and form phosphoric acid. Generally speaking, the use of a dilute phosphoric acid aqueous solution to hydrate said gaseous anhydride is preferable.

The present invention also discloses a process for producing phosphoric acid, which comprises the purification process of the present invention.

The present invention will be better understood through the following examples which are illustrative only and not for limiting the scope of the present invention.

EXAMPLE 1

1000 g of a waste acid from the photoelectric industry was used, and its main components are shown in Table 1.

TABLE 1

Main components of a waste acid from the photoelectric industry

| | |
|---|---|
| Phosphoric acid | 68.7% |
| Acetic acid | 7.2% |
| Nitric acid | 3.4% |
| Aluminum | 0.048% |

Poured the waste acid in a pyriform flask of a rotary evaporator. The pyriform flask was slantly mounted in a water bath at 90° C., and rotated at about 60 rpm while being vacuumed to remove the acetic acid and nitric acid from the waste acid. After 60 minutes, 745 g of a crude phosphoric acid liquid was obtained, the composition of which was analyzed and is shown in Table 2.

TABLE 2

Main ingredients of the crude phosphoric acid liquid

| | |
|---|---|
| Phosphoric acid | 92% |
| Acetic acid | N/D* |
| Nitric acid | N/D |
| Aluminum | 0.064% |

*N/D—non-detected, hereinafter abbreviated as N/D 500 g of the crude phosphoric acid liquid was placed in the apparatus shown in FIG. 1, wherein 10 represents a graphite heating chamber, 20 represents a cover, and 30 represents a ventilation tube. Said graphite heating chamber 10 was heated in an electric furnace 40 in order to decompose the crude phosphoric acid liquid into phosphoric anhydride. The phosphoric anhydride was introduced into 100 ml of water through the ventilation tube 30 on the cover 20, thereby obtaining 530 g of phosphoric acid having a composition shown in Table 3.

TABLE 3

Main composition of the phosphoric acid

| | |
|---|---|
| Phosphoric acid | 81.7% |
| Acetic acid | N/D |
| Nitric acid | N/D |
| Aluminum | 1.2 ppm |

EXAMPLE 2

Figure 2:
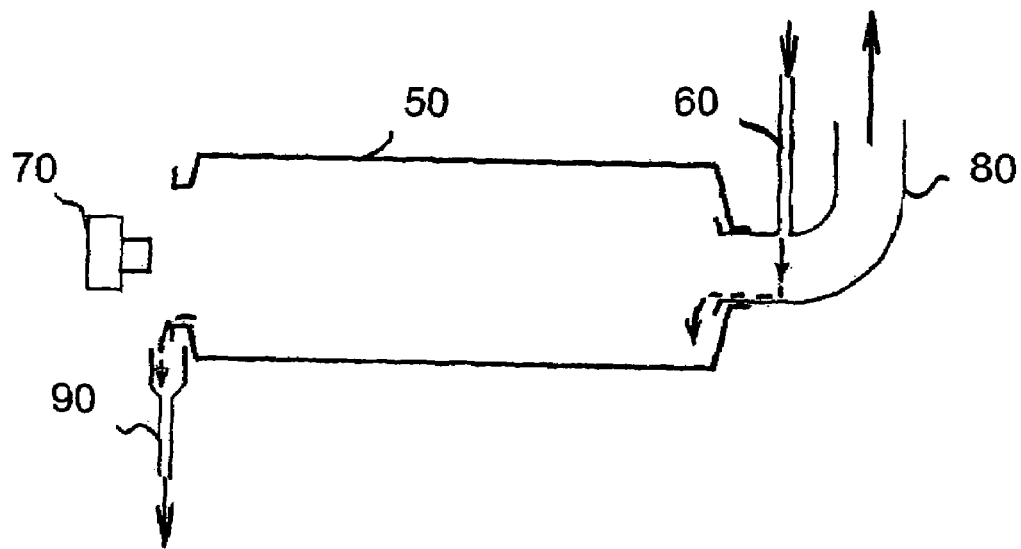
FIG. 2 is a schematic diagram of a rotary heating evaporation furnace device according to the present invention.

As shown in FIG. 2, 50 represents a rotary furnace. A waste phosphoric acid was introduced into the furnace through a conduit 60. 70 represents a combustion device using an ordinary fuel. The combustion flame from the combustion device 70 was introduced into the furnace so that the waste phosphoric acid solution in the form of a film on the wall of the rotary furnace was heated directly. The volatile gas resulting from evaporation was evacuated through a ventilation tube 80. The crude phosphoric acid depleted of the volatile components flew out through a conduit 90. In the present example, the fuel to the combustion device was controlled to adjust the temperature of the crude phosphoric acid flowing out from the conduit 90. The analysis results in this example are shown in Table 4.

TABLE 4

Analysis results of crude phosphoric acid

| | Samples at various temp. | | | | |
|---|---|---|---|---|---|
| Items of analysis | Waste phosphoric acid before entering the furnace | 80° C. Crude phosphoric acid | 100° C. Crude phosphoric acid | 120° C. Crude phosphoric acid | 150° C. Crude phosphoric acid |
| Phosphoric acid (%) | 68.7 | 82.3 | 86.5 | 89.8 | 96.8 |
| Acetic acid (%) | 7.2 | 4.5 | 0.3 | — | — |
| Nitric acid (%) | 3.4 | 0.2 | — | — | — |
| Aluminum (ppm) | 480 | 570 | 615 | 631 | 686 |

EXAMPLES 3–7

Figure 3:
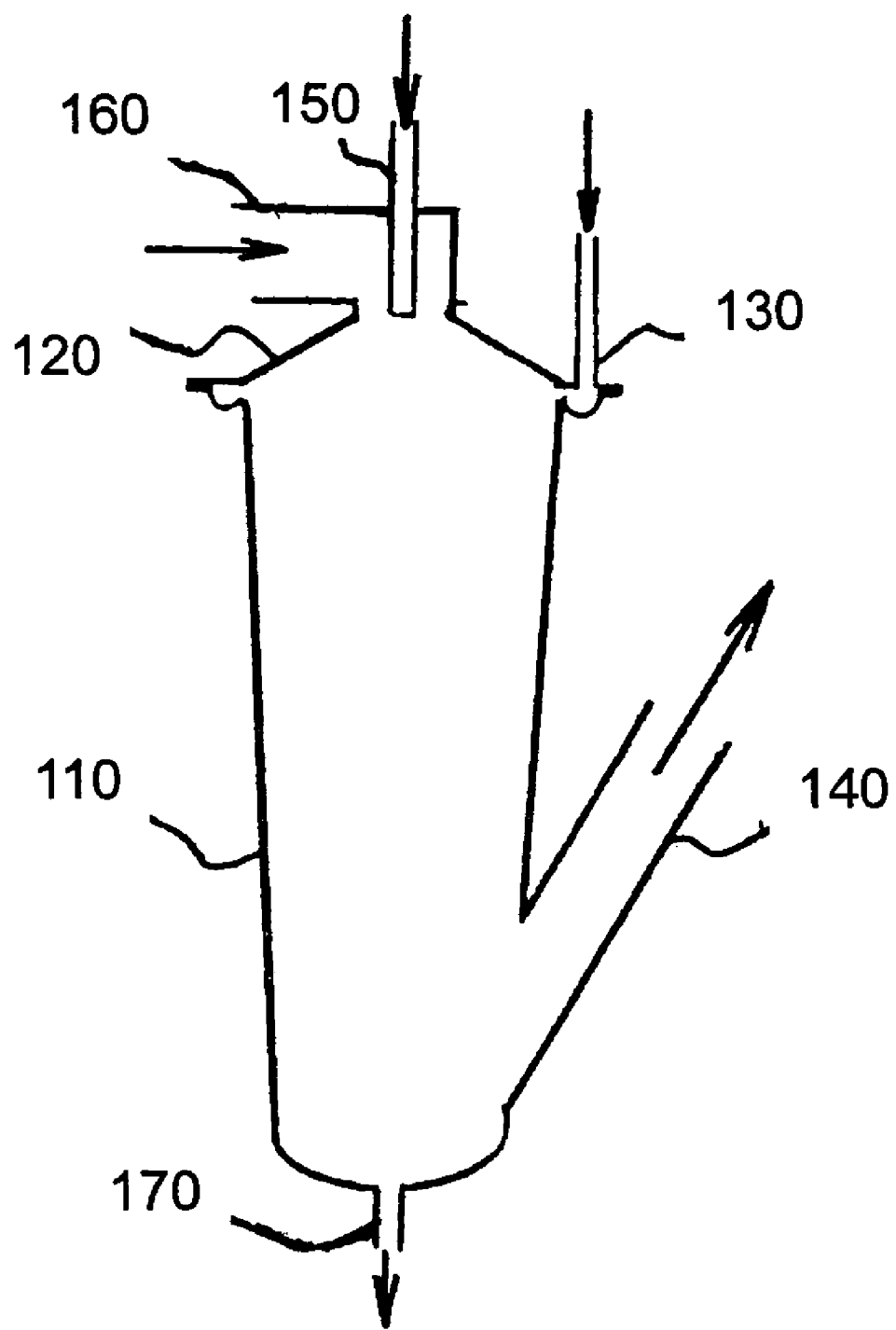
FIG. 3 is a schematic diagram of a phosphorus combustion chamber according to the present invention.

As shown in FIG. 3, 110 represents the furnace body of a phosphorus combustion chamber and 120 represents an upper cover of the furnace body. A crude phosphoric acid at 150° C. from Example 2 was directly introduced through a conduit 130 into the upper end of the furnace body, from which it overflew to form a uniform liquid film of the crude phosphoric acid on the furnace wall. Phosphorus was sprayed into the furnace for combustion through a nozzle 150, and the required air was introduced through a conduit 160. The liquid film of the crude phosphoric acid liquid was directly heated by the combustion heat from the combustion of phosphorus, and was decomposed into gaseous phosphoric anhydride, which was introduced through a conduit 140 to a hydration absorption process in the dry process for producing phosphoric acid to be hydrated with pure water into clean phosphoric acid. The residual crude phosphoric acid liquid was discharged from a conduit 170 at the bottom of the furnace. The results of these examples are shown in Table 5.

TABLE 5

Results of Examples 3–7

| Example | Amount of crude phosphoric acid introduced (kg) | Amount of phosphorus introduced (kg) | Temp. of gaseous phosphoric anhydride | Amount of hydrated phosphoric acid produced (kg) | Conc. of hydrated phosphoric acid (%) | Amount of aluminum in the hydrated phosphoric acid (ppm) |
|---|---|---|---|---|---|---|
| 3 | 1732 | 142 | 365° C. | 1945 | 83.0 | 1.32 |
| 4 | 1590 | 145 | 421° C. | 1890 | 85.2 | 0.84 |
| 5 | 1390 | 146 | 502° C. | 1825 | 86.0 | 0.52 |
| 6 | 1246 | 148 | 571° C. | 1736 | 86.3 | 0.96 |
| 7 | 1143 | 150 | 626° C. | 1650 | 86.5 | 1.06 |

EXAMPLES 8–12

The procedures in Examples 3–7 were repeated, except that natural gas was used as fuel to replace phosphorus. The results of these examples are shown in Table 6.

TABLE 6

Results of Examples 8–12

| Example | Amount of crude phosphoric acid introduced (kg) | Amount of natural gas introduced (kg) | Temp. of gaseous phosphoric anhydride | Amount of hydrated phosphoric acid produced (kg) | Conc. of hydrated phosphoric acid (%) | Amount of aluminum in the hydrated phosphoric acid (ppm) |
|---|---|---|---|---|---|---|
| 8 | 1802 | 89 | 381° C. | 1617 | 85.2 | 1.35 |
| 9 | 1795 | 102 | 468° C. | 1660 | 86.1 | 1.36 |
| 10 | 1790 | 115 | 512° C. | 1742 | 86.0 | 2.45 |
| 11 | 1800 | 128 | 590° C. | 1769 | 86.2 | 3.1 |
| 12 | 1785 | 141 | 645° C. | 1763 | 86.3 | 3.2 |

Although the present invention has been described with reference to specific details of certain embodiments thereof, it is not intended that such details should be regarded as limitations upon the scope of the invention except as and to the extent that they are included in the accompanying claims. Many modifications and variations are possible in light of the above disclosure.

The invention claimed is:

1. A process for producing phosphoric acid comprising a purification process, wherein said purifying process comprises the following steps:
   removing volatile components from phosphoric acid rich in impurities, wherein said phosphoric acid rich in impurities is a phosphoric acid product produced by a wet process, to form a crude phosphoric acid liquid substantially free of volatile components;
   heating said crude phosphoric acid liquid to a temperature above 250° C. in order to decompose phosphoric acid in said crude phosphoric acid liquid and generate gaseous phosphoric anhydride; and
   introducing said gaseous phosphoric anhydride into water or a dilute phosphoric acid aqueous solution in order to hydrate said gaseous phosphoric anhydride to form phosphoric acid,
   wherein said step of heating said crude phosphoric acid liquid comprises heating said crude phosphoric acid liquid with a combustion heat comprising introducing said crude phosphoric acid liquid into a phosphorus combustion chamber where phosphorus is combusted.

2. The process as claimed in claim 1, wherein said step of removing volatile components comprises heating to a temperature above 80° C.

3. The process as claimed in claim 2, wherein said step of removing volatile components comprises heating to a temperature above 100° C.

4. The process as claimed in claim 3, wherein said step of removing volatile components comprises heating the phosphoric acid rich in impurities in vacuo or heating the phosphoric acid rich in impurities while air is being introduced to entrain the volatile components from the phosphoric acid rich in impurities.

5. The process as claimed in claim 1, wherein said step of introducing the gaseous anhydride into water or a dilute phosphoric acid aqueous solution to hydrate said gaseous anhydride into phosphoric acid comprises introducing said gaseous phosphoric anhydride generated by decomposition and a gaseous phosphoric anhydride resulting from the combustion of phosphorus into water or said dilute phosphoric acid aqueous solution to hydrate said gaseous phosphoric anhydride and form phosphoric acid.

6. The process as claimed in claim 1, wherein said crude phosphoric acid liquid is introduced into said phosphorus combustion chamber in a manner so that a film of said crude phosphoric acid liquid is formed on a wall of the combustion chamber, and is heated and decomposed to generate gaseous phosphoric anhydride.

7. The process as claimed in claim 6, wherein an average temperature of said gaseous phosphoric anhydride is kept at 300 to 800° C. during said step of heating said crude phosphoric acid liquid to generate gaseous phosphoric anhydride by decomposition.

8. The process as claimed in claim 7, wherein the average temperature of said gaseous phosphoric anhydride is kept at 350 to 600° C.

9. The process as claimed in claim 8, wherein said hydration step comprises using said dilute phosphoric acid aqueous solution to hydrate said gaseous phosphoric anhydride into phosphoric acid.

10. The process as claimed in claim 5, wherein an average temperature of said gaseous phosphoric anhydride is kept at 300 to 800° C. during said step of heating said crude phosphoric acid liquid to generate gaseous phosphoric anhydride by decomposition.

11. The process as claimed in claim 10, wherein the average temperature of said gaseous phosphoric anhydride is kept at 350 to 600° C.

12. The process as claimed in claim 11, wherein said hydration step comprises using said dilute phosphoric acid aqueous solution to hydrate said gaseous phosphoric anhydride into phosphoric acid.

* * * * *